United States Patent
Dishman et al.

(10) Patent No.: US 12,259,766 B2
(45) Date of Patent: Mar. 25, 2025

(54) UTILIZING CLOSE-RANGE SENSOR IN POWER SUPPLY UNIT TO IDENTIFY POWER CORD RATING/TYPE

(71) Applicant: Lenovo Enterprise Solutions (Singapore) Pte. Ltd., New Tech Park (SG)

(72) Inventors: Cecil C Dishman, Raleigh, NC (US); Jessi Carolina Lozada Picon, Cary, NC (US); Kelly O'Toole, Raleigh, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 35 days.

(21) Appl. No.: 18/129,486

(22) Filed: Mar. 31, 2023

(65) Prior Publication Data
US 2024/0329706 A1 Oct. 3, 2024

(51) Int. Cl.
*G06F 1/26* (2006.01)
*G06F 1/18* (2006.01)
*G06F 1/28* (2006.01)
*G06F 11/22* (2006.01)
*G06F 11/30* (2006.01)
*G06F 21/44* (2013.01)
*G06K 7/10* (2006.01)
*G08B 7/00* (2006.01)

(52) U.S. Cl.
CPC .......... *G06F 1/26* (2013.01); *G06K 7/10366* (2013.01); *G06F 1/189* (2013.01); *G06F 1/28* (2013.01); *G06F 11/22* (2013.01); *G06F 11/3051* (2013.01); *G06F 21/44* (2013.01); *G08B 7/00* (2013.01)

(58) Field of Classification Search
CPC ... G06F 1/26; G06F 1/28; G06F 1/189; G06F 11/3051; G06F 21/44; G06F 11/22; G06K 7/10366; G08B 7/00
USPC ................ 713/300, 340; 710/16; 714/25, 40
See application file for complete search history.

(56) References Cited

U.S. PATENT DOCUMENTS 8,471,415 B1 * 6/2013 Heninwolf ............. H01R 24/76
307/140
9,520,043 B1 * 12/2016 Alshinnawi ......... G06F 13/4068
(Continued)

OTHER PUBLICATIONS

Pinto, "RFID technology places Nexans at the forefront of cable innovation", Nexans, date created Jun. 9, 2020, date accessed Nov. 29, 2022, pp. 1-5.
(Continued)

*Primary Examiner* — Ji H Bae
(74) *Attorney, Agent, or Firm* — Kunzler Bean & Adamson; Bruce R. Needham (57) ABSTRACT

A method for verifying correct power cord usage includes detecting, with a close-range sensor, a close-range sensor tag in a power cord near a power receptacle of a power supply of a computing device and reading cord information stored on the close-range sensor tag. The method includes determining from the cord information that the power cord is of a type that is not rated for use with the power supply and disabling startup of the power supply in response to determining that the power cord is of a type that is not rated for use with the power supply.

22 Claims, 6 Drawing Sheets

(56) References Cited

U.S. PATENT DOCUMENTS

| | | | |
|---|---|---|---|
| 2006/0206735 A1* | 9/2006 | Nagafusa | H02H 3/006 |
| | | | 713/300 |
| 2007/0085872 A1* | 4/2007 | Teradaira | B41J 29/393 |
| | | | 347/19 |
| 2015/0002296 A1* | 1/2015 | Bell | H01R 13/6397 |
| | | | 340/540 |
| 2016/0275773 A1* | 9/2016 | Dharmadhikari | G06F 13/14 |
| 2019/0340399 A1* | 11/2019 | Werner | G06K 7/10366 |
| 2019/0363493 A1* | 11/2019 | Sironi | H02H 1/0007 |
| 2021/0203114 A1* | 7/2021 | Yang | H01R 31/06 |

OTHER PUBLICATIONS

Schmoldt, "RFID & NFC: RFID That Keeps You Well-Connected", Mouser Electronics, date accessed Nov. 29, 2022, pp. 1-3.

* cited by examiner

FIG. 6

UTILIZING CLOSE-RANGE SENSOR IN POWER SUPPLY UNIT TO IDENTIFY POWER CORD RATING/TYPE

FIELD

The subject matter disclosed herein relates to power cords for power supplies or intelligent power distribution units ("PDUs") of computing devices and more particularly relates to using a close-range sensor for a power supply to identify a power cord rating or usage type.

BACKGROUND

In some instances, a power receptacle of a power supply in a computing device is capable of accepting plugs of power cords that have a rating that is incompatible with the power supply. For example, the common International Electrotechnical Commission ("IEC") 320 C14 and C20 power receptacle allows for power ranges up to 10 amperes ("A") and 16 amperes ("A") respectively. Some countries, such as the United States however allow a current rating up to 15 A for the C14 and 20 A for the C20 power receptacles depending on the wire size of a power cord plugged into the power receptacle. If a power supply is rated for 15 A then a cord made with 18 American Wire Gauge ("AWG") wire (rated for 10 A) or 16 AWG wire (rated for 13 A) could be inserted causing an overload of the rating of the cord, which could cause a thermal event. In addition, the C14 power inlet does not restrict a power supply unit ("PSU") certified for use in certain countries from accepting cords that are for use in countries the PSU has not received appropriate regulatory compliance certifications.

BRIEF SUMMARY

A method for verifying correct power cord usage is disclosed. An apparatus and a system also perform the functions of the method. The method includes detecting, with a close-range sensor, a close-range sensor tag in a power cord near a power receptacle of a power supply of a computing device and reading cord information stored on the close-range sensor tag. The method includes determining from the cord information that the power cord is of a type that is not rated for use with the power supply and disabling startup of the power supply in response to determining that the power cord is of a type that is not rated for use with the power supply.

An apparatus for verifying correct power cord usage includes a close-range sensor configured to detect a close-range sensor tag in a power cord near a power receptacle of a power supply of a computing device and to read cord information stored on the close-range sensor tag. The apparatus includes a cord compliance module configured to determine from the cord information that the power cord is of a type that is not rated for use with the power supply and a startup prevention module configured to disable startup of the power supply in response to the cord compliance module determining that the power cord is of a type that is not rated for use with the power supply. The modules include hardware circuits, a programmable hardware device, and/or executable code stored on non-transitory computer readable storage media.

A system for verifying correct power cord usage includes a computing device with a processor, a power supply in the computing device providing power to components of the computing device, and a close-range sensor configured to detect a close-range sensor tag in a power cord near a power receptacle of the power supply of the computing device and to read cord information stored on the close-range sensor tag. The system includes a cord compliance module configured to determine from the cord information that the power cord is of a type that is not rated for use with the power supply and a startup prevention module configured to disable startup of the power supply in response to the cord compliance module determining that the power cord is of a type that is not rated for use with the power supply. The modules include hardware circuits, a programmable hardware device, and/or executable code stored on non-transitory computer readable storage media of the computing device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R. Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising." "having." and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for verifying correct power cord usage is disclosed. An apparatus and a system also perform the functions of the method. The method includes detecting, with a close-range sensor, a close-range sensor tag in a power cord near a power receptacle of a power supply of a computing device and reading cord information stored on the close-range sensor tag. The method includes determining from the cord information that the power cord is of a type that is not rated for use with the power supply and disabling startup of the power supply in response to determining that the power cord is of a type that is not rated for use with the power supply.

In some embodiments, the method includes, in response to determining that the power cord is of a type that is not rated for use with the power supply, sending an alert indicating that the power cord is not rated for use with the power supply. In other embodiments, the alert is transmitted to an external computing device external to the computing device. In further embodiments, the external computing device is a management server and the alert is transmitted to a baseboard management controller ("BMC") in the computing device and the BMC transmits the alert to the management server.

In some embodiments, the method includes, in response to determining that the power cord is of a type that is not rated for use with the power supply, generating a visual alert signal for a visual indictor on the computing device visible to a user and/or generating an audible indicator for a speaker in the computing device. In other embodiments, in response to the cord information indicating that the power cord is configured for a current lower than the rated current and/or a voltage higher than a rated voltage of the power supply, the method includes generating the visual alert signal and/or generating the audible indicator to provide a warning message prior to the power cord being plugged into the power supply. The warning message is configured to warn a user to not plug the power cord into the power supply.

In some embodiments, determining from the cord information that the power cord is of a type that is not rated for use with the power supply includes determining that from the cord information that the power cord is not approved for use with the power supply by a regulatory agency with jurisdiction over power cords. In other embodiments, the close-range sensor is located in a plug of the power cord and detecting the close-range sensor tag near the power cord includes detecting the close-range sensor tag in the plug is within 10 centimeters of the power receptacle of the power supply. In other embodiments, detecting the close-range sensor tag includes a Radio Frequency Identifier ("RFID") tag. In other embodiments, the power cord includes a plug configured to plug into the power supply where the plug is compliant with an International Electrotechnical Commission ("IEC") 320 C13 standard.

An apparatus for verifying correct power cord usage includes a close-range sensor configured to detect a close-range sensor tag in a power cord near a power receptacle of a power supply of a computing device and read cord information stored on the close-range sensor tag. The apparatus includes a cord compliance module configured to determine from the cord information that the power cord is of a type that is not rated for use with the power supply and a startup prevention module configured to disable startup of the power supply in response to the cord compliance module determining that the power cord is of a type that is not rated for use with the power supply. The modules include hardware circuits, a programmable hardware device, and/or executable code stored on non-transitory computer readable storage media.

In some embodiments, the apparatus includes an alert module configured to, in response to the cord compliance module determining that the power cord is of a type that is not rated for use with the power supply, send an alert indicating that the power cord is not rated for use with the power supply. In other embodiments, the alert is transmitted to an external computing device external to the computing device. In further embodiments, the external computing device is a management server and the alert is transmitted to a BMC in the computing device and the BMC transmits the alert to the management server.

In some embodiments, the apparatus includes, in response to the cord compliance module determining that the power cord is of a type that is not rated for use with the power supply, a light module configured to generate a visual alert signal for a visual indictor on the computing device visible to a user and/or a sound module configured to generate an audible indicator for a speaker in the computing device. In further embodiments, in response to the cord information indicating that the power cord is configured for a current lower than the rated current and/or a voltage higher than a rated voltage of the power supply, the light module is configured to generate the visual alert signal and/or the sound module is configured to generate the audible indicator to provide a warning message prior to the power cord being plugged into the power supply where the warning message is configured to warn a user to not plug the power cord into the power supply.

In some embodiments, determining from the cord information that the power cord is of a type that is not rated for use with the power supply includes determining that from the cord information that the power cord is not approved for use with the power supply by a regulatory agency with jurisdiction over power cords. In other embodiments, the close-range sensor is located in a plug of the power cord and detecting the close-range sensor tag near the power cord includes detecting the close-range sensor tag in the plug is within 10 centimeters of the power receptacle of the power supply.

A system for verifying correct power cord usage includes a computing device with a processor, a power supply in the computing device providing power to components of the computing device, and a close-range sensor configured to detect a close-range sensor tag in a power cord near a power receptacle of the power supply of the computing device and to read cord information stored on the close-range sensor tag. The system includes a cord compliance module configured to determine from the cord information that the power cord is of a type that is not rated for use with the power supply and a startup prevention module configured to disable startup of the power supply in response to the cord compliance module determining that the power cord is of a type that is not rated for use with the power supply. The modules includes hardware circuits, a programmable hardware device, and/or executable code stored on non-transitory computer readable storage media of the computing device.

In some embodiments, the system includes an alert module configured to, in response to the cord compliance module determining that the power cord is of a type that is not rated for use with the power supply, send an alert indicating that the power cord is not rated for use with the power supply.

Figure 1:
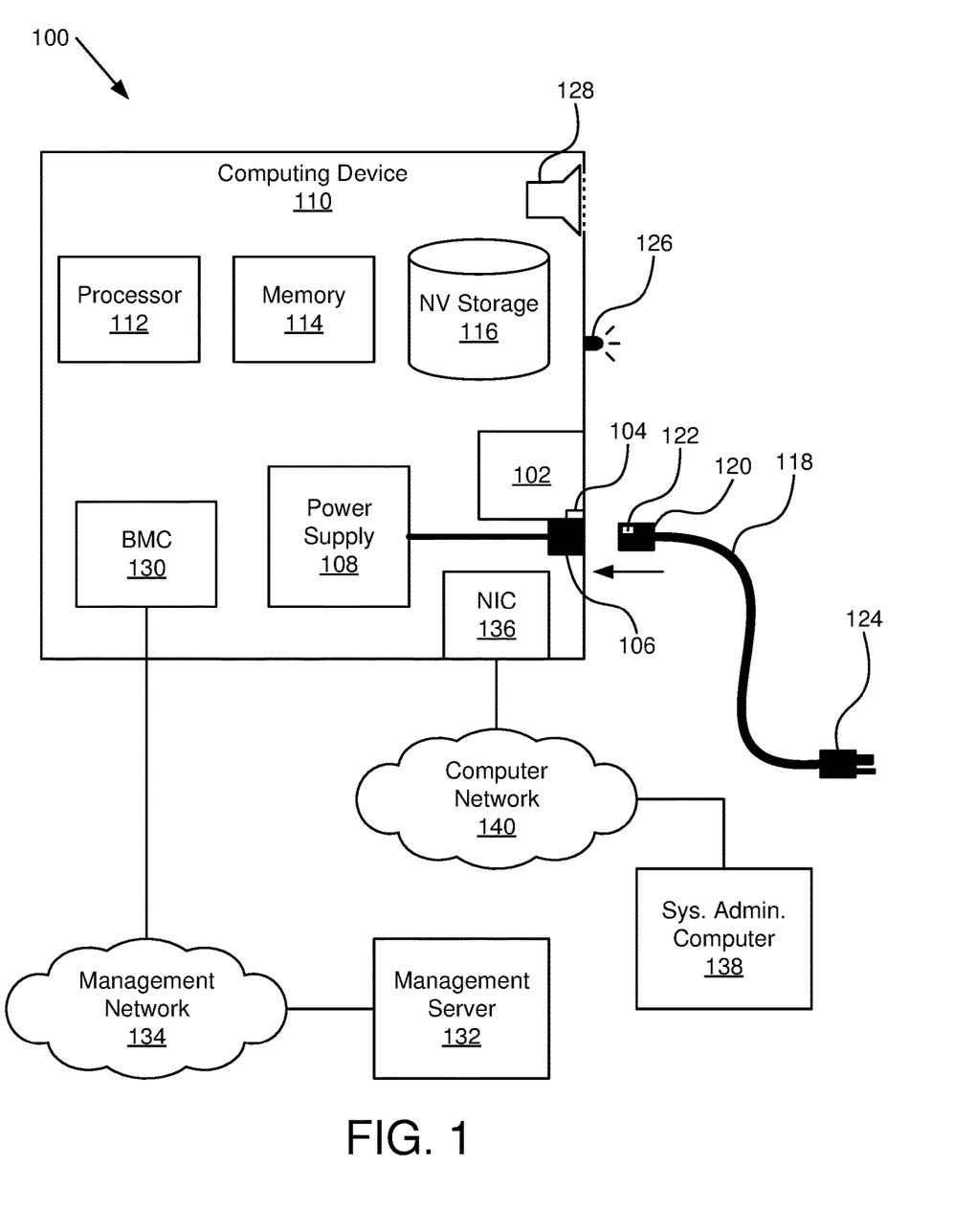
FIG. 1 is a schematic block diagram illustrating a system for verifying correct power cord usage, according to various embodiments.

FIG. 1 is a schematic block diagram illustrating a system 100 for verifying correct power cord usage, according to various embodiments. The system 100 includes a protection apparatus 102 with a close-range sensor 104 adjacent to a power receptacle 106 of a power supply 108 of a computing device 110. The computing device 110 is typical of a desktop computer, a workstation, or the like that includes a power supply 108 that connects to a power source via a power cord 118 with a plug 120 that fits in a power receptacle 106 feeding the power supply 108. The computing device 110 may include one or more processors 112, memory 114, and may include a non-volatile storage device 116, such as solid-state storage, a hard disk drive, or the like. Various close-range sensor technologies and functions are discussed below in relation to the close-range sensor 104 of FIG. 3.

A problem with some types of power cords 118 is that the power cords 118 may have different configurations, wire sizes, support different voltages, etc. that all may have a common plug 120 and corresponding power receptacle 106 in the computing device 110. Thus, a power cord 118 may not match power, voltage, and/or current requirements of the computing device 110. A mismatched computing device 110 and power cord 118 may cause damage and/or thermal event in the power cord 118 or computing device 110.

For example, the computing device 110 may have a power requirement that requires 15 amperes ("A") of current. The power cord 118 may include 16 or 18 American Wire Gauge ("AWG") wire, which does not support 15 A of current. Power cords 118 with 16 or 18 AWG wire may be appropriate for lower power computing devices. Each of the power cords 118 may have a same plug 120 that fits in the power receptacle 106 of the computing device 110. In another example, a power cord 118 with a wall plug 124 configured to plug into a 220 volt ("V") wall receptacle may include a plug 120 that fits into the power receptacle 120 of the computing device 110, which may be rated for 110 V. Plugging a power cord 118 into a wall receptacle with 220 V and then plugging the other end with a plug 120 that fits into the power receptacle 106 of the computing device 110 may cause damage to the computing device 110.

The embodiments described herein include a protection apparatus 102 with a close-range sensor 104 configured to read a close-range sensor tag 122 in a power cord 118 then read cord information stored on the close-range sensor tag 122. The protection apparatus 102 is configured to determine from the cord information that the power cord is of a type that is rated or not rated for use with the power supply 108 of the computing device 110. Where the protection apparatus 102 determines that the power cord 118 is not rated for use with the power supply 108 of the computing device 110, the protection apparatus 102 disables startup of the power supply 108, and optionally sends an alert, lights a visual indicator 126, or generates an audible indicator for a speaker 128 in the computing device 110 to warn a user that the power cord 118 is not suitable for the computing device 110. The protection apparatus 102 is explained in more detail below with respect to the apparatuses 300, 400 of FIGS. 3 and 4.

In some embodiments, the computing device 110 includes a baseboard management controller ("BMC") 130 connected to a management server 132 over a management network 134. The protection apparatus 102 may send an alert via the BMC 130 to the management server 132. In other embodiments, the protection apparatus 102 sends an alert through a network interface card 136 to a system administrator computer 138 or other computer of a system administrator or other user over a computer network 140, for example, where the computing device 110 does not include a BMC 130.

The BMC 130, in some embodiments, provides access to the computing device 110 over the management network 134 for various control functions, such as startup, shutdown, installation of software and firmware, upgrading of software and firmware, monitoring operation of the computing device 110, and the like. One embodiment of the BMC 130 is a Lenovo® XClarity® Controller ("XCC"). In some embodiments, the BMC 130 controls startup of the power supply 108, which precedes startup of the computing device 110 and the protection apparatus 102 coordinates with the BMC 130 to disable startup of the power supply 108 as needed. In some embodiments, a portion of the protection apparatus 102 resides in the BMC 130. While the BMC 130 is depicted as connected directly to the management network 134, in some embodiments, the BMC 130 communicates over the management network 134 through a network interface card ("NIC") 136.

In other embodiments where the computing device 110 does not include a BMC 130, the computing device 110 includes a Unified Extensible Firmware Interface ("UEFI"), Basic Input/Output System ("BIOS"), etc. and a portion of the protection apparatus 102 is accessible in non-volatile memory to the UEFI, BIOS, etc. In some embodiments, the UEFI, BIOS, etc. is implemented in firmware stored in the non-volatile memory accessible to the UEFI, BIOS, etc. In some embodiments, the protection apparatus 102 sends an alert via the UEFI, BIOS, etc. via the NIC 136.

The management network 134 is typically a private network. In some embodiments, the management network 134 operates over a public network using a security protocol to remain private. The computer network 140 may be private or public. The computer network 140 and/or management network 134 may include LAN, a WAN, may include the Internet, may include a fiber network, etc. and may be made up of multiple networks and/or network types. In some embodiments, the computer network 140 and/or management network 134 include a wireless connection.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

The power supply 108, in some embodiments, is switchmode converter that operates using semiconductor switches and that rectifies alternating current ("AC") voltage and creates one or more direct current ("DC") voltages suitable for power for components of the computing device 110. In some embodiments, the power supply 108 includes semiconductor switches arranged in full-bridge or half-bridge configuration and includes inductors, capacitors, etc. and may be disabled by disabling switching via the semiconductor switches. In addition, the power supply 108 typically includes a low power source that operates independently from the switchmode converter and that is suitable for providing power to control circuits of the power supply 108 and for providing power to the protection apparatus 102. In some embodiments, the low power source is powered by a battery or other energy storage device. In other embodiments, the low power source draws power from the power cord 118 even when the power cord 118 is incompatible with the computing device 110. In some embodiments, the low power source is capable of transmitting an alert, lighting a visual indicator 126, generating a warning message for the speaker 128, etc.

The visual indicator 126, in some embodiments, is a light source, such as a light emitting diode ("LED"), incandescent lamp, or the like. In other embodiments, the visual indicator 126 is a digital display capable of displaying a message, a code, etc. In some embodiments, the visual indicator 126 is used by the protection apparatus 102 as well as for other functions. In other embodiments, the visual indicator 126 is dedicated for use by the protection apparatus 102. In such embodiments, the visual indicator 126 may include text adjacent to the visual indicator 126 indicating that when the visual indicator 126 is lit that the power cord 118 is incompatible with the computing device 110.

The speaker 128, in some embodiments, is built into the computing device 110. In other embodiments, the speaker 128 is external to the computing device 110. In some embodiments, the warning message is a voice message. In other embodiments, the warning message is a fixed or variable tone. In some embodiments, the speaker 128 is a dedicated speaker for the protection apparatus 102. In other embodiments, the speaker 128 is a general use speaker used for other functions by the computing device 110.

Figure 2:
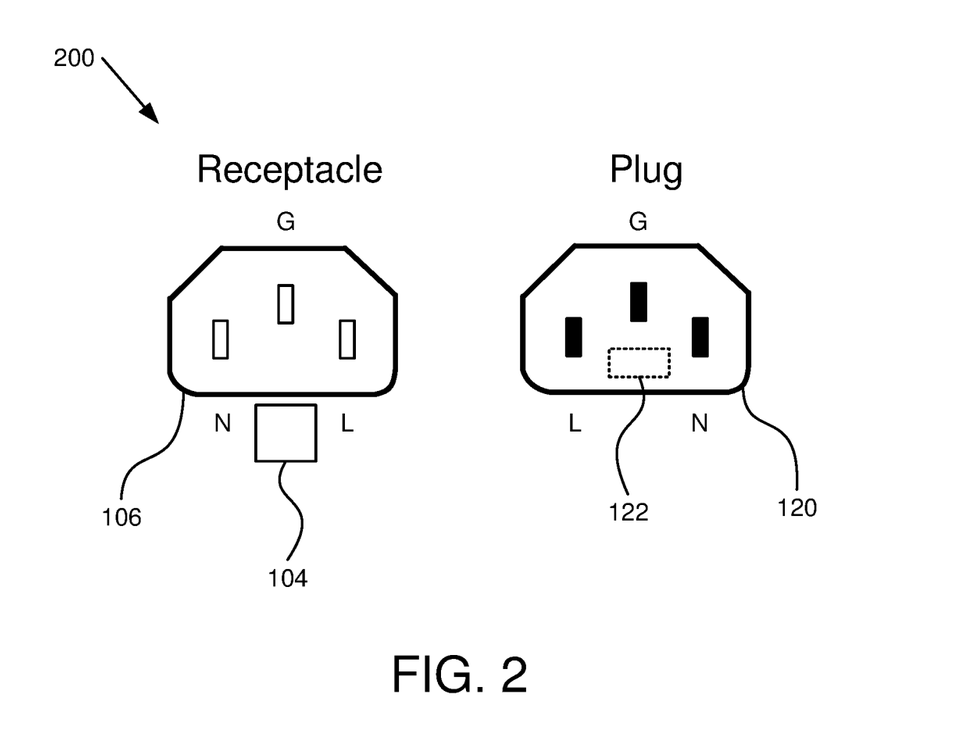
FIG. 2 is a schematic block diagram illustrating a plug configuration with a close-range sensor tag and receptacle configuration with a close-range sensor, according to various embodiments.

FIG. 2 is a schematic block diagram illustrating a plug configuration 200 with a close-range sensor tag 122 and receptacle configuration with a close-range sensor 104, according to various embodiments. The plug configuration 200 is a common type that meets a International Electrotechnical Commission ("IEC") 320 standard. The plug 120 is IEC 320 C13 compliant and the power receptacle 106 is IEC 320 C14 compliant and mates with the plug 120. The "L" depicts a prong on the power receptacle 106 and socket in the plug 120 for a line voltage connection. The "N" depicts a prong on the power receptacle 106 and socket in the plug 120 for a neutral voltage connection. The "G" depicts a prong on the power receptacle 106 and socket in the plug 120 for a grounding conductor connection. While a plug 120 and power receptacle 106 are depicted in an IEC 320 C13/C14 configuration, the embodiments described herein are also applicable to other power cord configurations where the power cord 118 has a plug 120 compatible with a power receptacle 106 and the power cord 118 may have different ratings.

The plug 120 includes a close-range sensor tag 122, which is depicted as a rectangle with dashed lines indicating that the close-range sensor tag 122 is embedded in the plug 120. The close-range sensor tag 122, in some embodiments, is embedded in the plug 120 for protection. In other embodiments, the close-range sensor tag 122 is embedded in a recess in the plug 120. In the embodiments, the close-range sensor tag 122 may include a covering for protection. The recess may be where the dashed rectangle is located or may be located elsewhere. In other embodiments, the close-range sensor tag 122 is mounted to the surface of the plug 120. For example, the close-range sensor tag 122 may be located outside of an area covered by the power receptacle 106 and may also be affixed to the power cord 118. The closer the close-range sensor tag 122 is to the power receptacle 106 the shorter the close-range sensing technology may be to sense the close-range sensor tag 122.

The close-range sensor 104 is depicted adjacent to the power receptacle 106, which is beneficial for detection of the close-range sensor tag 122. The close-range sensor 104 is depicted just below the power receptacle 106, but may be in any beneficial location near the power receptacle 106. The closer the close-range sensor 104 is to the power receptacle 106, the shorter the close-range sensing technology may be to sense the close-range sensor tag 122. Ideally, the close-range sensor 104 has a range short enough to sense when the plug 120 is close to being inserted in the power receptacle 106 without sensing other power cords 118 in the vicinity of the power receptacle 106. In some embodiments, the close-range sensor 104 senses the close-range sensor tag 122 just prior to the plug 120 being plugged into the power receptacle 106. The close-range sensor 104, the power receptacle 106, the plug 120, and the close-range sensor tag 122 are discussed in more detail below.

Figure 3:
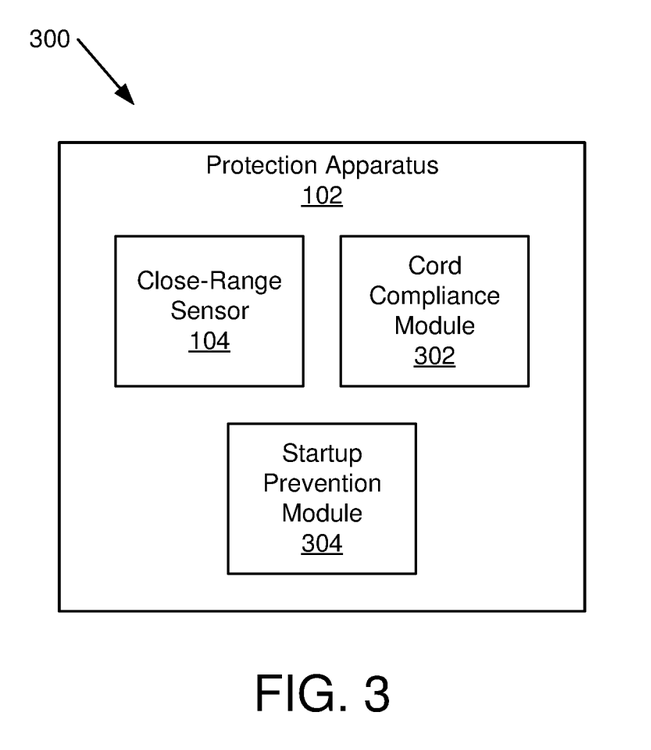
FIG. 3 is a schematic block diagram illustrating an apparatus for verifying correct power cord usage, according to various embodiments.

FIG. 3 is a schematic block diagram illustrating an apparatus 300 for verifying correct power cord usage, according to various embodiments. The apparatus 300 includes a protection apparatus 102 with a close-range sensor 104, a cord compliance module 302, and a startup prevention module 304, which are described below. In some embodiments, all or a portion of the apparatus 300 is implemented using hardware circuits. In other embodiments, at least a portion of the apparatus 300 is implemented using a programmable hardware device and/or executable code stored in firmware or other non-volatile computer readable storage media. One of skill in the art will recognize other ways to implement the apparatus 300.

The apparatus 300 includes a close-range sensor 104 configured to detect a close-range sensor tag 122 in a power cord 118 near a power receptacle 106 of a power supply 108 of a computing device 110. The power cord 118, as used herein, includes a plug 120 configured to plug into the power receptacle 106. The power cord 118, in some embodiments, also includes a plug 124 opposite the plug 120 that fits in the power receptacle 106 and is configured to connect to a power source, such as a wall receptacle, a power strip, a power distribution unit, or the like.

In some embodiments, the close-range sensor 104 is configured to sense the close-range sensor tag 122 just prior to the plug 120 being plugged into the power receptacle 106 and to read cord information stored on the close-range sensor tag 122. In other embodiments, the close-range sensor 104 is configured to sense and read the close-range sensor tag 122 after being plugged into the power receptacle 106. In some embodiments, however, there is a benefit to the close-range sensor 104 sensing and reading the close-range sensor tag 122 prior to being plugged into the power receptacle 106, as described below.

The close-range sensor 104 uses a close-range sensor technology that is effective at a relatively close range, such as on the order of 0 centimeter ("cm") to 20 cm. In some embodiments, the close-range sensor technology is of the close-range sensor 104 is able to sense and read the close-range sensor tag 122 within about 10 cm (e.g., about 8-12 cm). In some embodiments, the close-range sensor 104 uses a radio frequency identifier ("RFID") technology. In other embodiments, the close-range sensor 104 uses an RFID technology with a range limited to about 0-20 cm or shorter. For example, the close-range sensor 104 and associated technology use a combination of frequency, power level, shielding, etc. to limit reading the close-range sensor tag 122 to about a 1-20 cm range or shorter. In other embodiments, the close-range sensor 104 uses another technology, such as infrared, near-field communication ("NFC"), Wi-Fi with a Wi-Fi tracking tag, ultra-wide band ("UWB") technology, or other close-range sensor technology configured and/or customized to sense a close-range sensor tag 122 in about the 0-20 cm range or shorter.

In some embodiments, the close-range sensor 104 includes a hardware sensor. In other embodiments, the close-range sensor 104 includes supporting hardware, software, etc. to provide close-range sensor capabilities. One of skill in the art will recognize other forms of a close-range sensor 104 capable of sensing and reading a close-range sensor tag 122 in a power cord 118 just prior to or in connection with a plug 120 of the power cord 118 being plugged into a power receptacle 106.

In some embodiments, the close-range sensor 104 is located adjacent to the power receptacle 106. In some examples, the close-range sensor 104 is in a case of the computing device 110 near the power receptacle 106. In other embodiments, the close-range sensor 104 is located external to the case of the computing device 110, such as around the periphery of the power receptacle 106. In other embodiments, the close-range sensor 104 is built into the power receptacle 106.

In some embodiments, the close-range sensor 104 emits a waveform in a radial pattern away from the close-range sensor 104 in all directions to reach the close-range sensor tag 122. In other embodiments, the close-range sensor 104 emits a waveform in a directed pattern away from the close-range sensor 104 toward where the close-range sensor tag 122 would be located when being plugged into the power receptacle 106. In other embodiments, the close-range sensor 104 includes shielding so a beam is directed toward where a user is plugging in the plug 120 of the power cord 118 into the power receptacle 106. In some embodiments, the close-range sensor 104 is located on a first side of the power receptacle 106 and the close-range sensor tag 122 is located on a corresponding first side of the plug 120 to align with the close-range sensor 104 as the plug 120 is being plugged into the power receptacle 106. One of skill in the art will recognize other positions, shielding, etc. to configure the close-range sensor 104 to detect a close-range sensor tag 122 and read information from the close-range sensor tag 122.

The close-range sensor tag 122 is capable of storing cord information relevant to the power cord 118, such as a current rating, a voltage rating, a power rating, a configuration, manufacturing information, model information, regulatory agency approvals, or other vital product data ("VPD"). In some embodiments, the close-range sensor tag 122 is an RFID tag. In other embodiments, the close-range sensor tag 122 is a Wi-Fi tracking tag, or other tag capable of sending a signal with the cord information upon receiving a signal from the close-range sensor 104. In some embodiments, the close-range sensor tag 122 is energized by a signal from the close-range sensor 104 with sufficient energy to send the cord information. One of skill in the art will recognize other technologies capable of detecting and reading cord information from a close-range sensor tag 122 and other types of cord information useful in determining if the power cord 118 is compatible with the power supply 108.

The apparatus 300 includes a cord compliance module 302 configured to determine from the cord information that the power cord 118 is of a type that is not rated for use with the power supply 108. For example, the power supply 108 may have a requirement of 15 amperes ("A") and the power cord 118 may be rated to 12 A so the power cord 118 is not capable of supporting the power supply 108. In other embodiments, the power supply 108 is rated for a particular voltage and the power cord 118 is configured to be connected to a power source with a current lower than the rated current and/or a voltage higher than the voltage rating of the power supply 108. In other embodiments, a power rating of the power cord 118 is lower than a power requirement of the power supply 108. In other embodiments, close-range sensor tags 122 include information about regulatory agency compliance and the close-range sensor tag 122 of the power cord 118 and the power supply 108 lacks a regulatory approval required by the computing device 110. In some embodiments, the cord compliance module 302 is updated on a periodic basis with current ratings, certifications, and the like. One of skill in the art will recognize other compliance categories, ranges, etc. to be included in a close-range sensor tag 122 to be used to determine whether or not the power cord 118 is rated or not rated for use with the power supply 108.

The apparatus 300 includes a startup prevention module 304 configured to disable startup of the power supply 108 in response to the cord compliance module 302 determining that the power cord 118 is of a type that is not rated for use with the power supply 108. As used herein, startup of the power supply 108 means a process to enable the power supply 108 to use power from the power cord 118 to supply power to the computing device 110 for direct or indirect use by the computing device 110. Some computing devices 110 may include a battery and the power supply 108 is capable of providing power to components of the computing device 110 without power from the power cord 118 and power from the power cord 118 may then be used to charge the battery and/or power other components of the computing device 110. In such embodiments, the startup prevention module 304 disabling startup of the power supply 108 includes not allowing power from the power cord 118 to provide power to components of the computing device 110 as well as not allowing charging of a battery of the computing device 110.

Beneficially, the startup prevention module 304 preventing startup of the power supply 108 in response to the cord compliance module 302 determining that the power cord 118 is of a type that is not rated for use with the power supply 108 helps to prevent damage to the power cord 118, damage to the power supply 108, and/or damage to the computing device 110. For example, where the power cord 118 is rated for 10 A but the power supply requires 15 A, the protection apparatus 102 helps prevent overheating of the power cord 118, which may cause a thermal event in the power cord 118. In other embodiments, the power cord 118 may provide a voltage that is too high for the power supply 108 so the protection apparatus 102 may prevent damage to the power supply 108 and/or to the computing device 110. For example, the power supply 108 may be rated for 110 volts ("V") and a voltage of 220 V on the power cord 118 may damage components of the power supply 108, such as a metal oxide varistor ("MOV") protecting the power supply 108.

Figure 4:
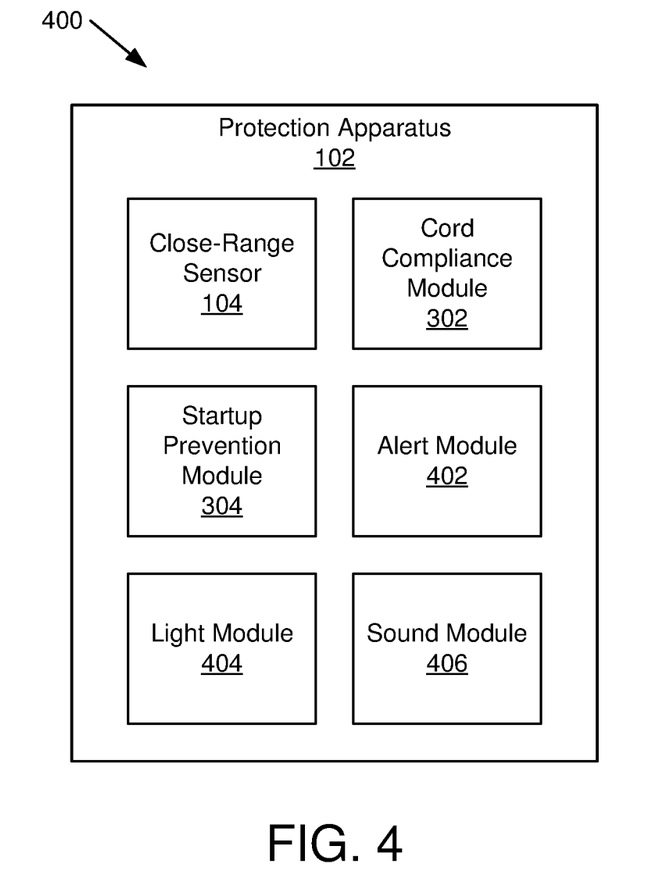
FIG. 4 is a schematic block diagram illustrating another apparatus for verifying correct power cord usage, according to various embodiments.

FIG. 4 is a schematic block diagram illustrating another apparatus 400 for verifying correct power cord usage, according to various embodiments. The apparatus 400 includes a protection apparatus 102 with a close-range sensor 104, a cord compliance module 302, and a startup prevention module 304 which are substantially similar to those described above in relation to the apparatus 300 of FIG. 3. The protection apparatus 102, in various embodiments, includes an alert module 402, a light module 404, and/or a sound module 406, which are described below. The apparatus 400 of FIG. 4 may be implemented similarly to the apparatus 300 of FIG. 3.

The apparatus 400 includes an alert module 402 configured to, in response to the cord compliance module 302 determining that the power cord 118 is of a type that is not rated for use with the power supply 108, send an alert indicating that the power cord 118 is not rated for use with the power supply 108. In some embodiments, the alert module 402 is configured to send an alert to an external computing device, such as a computer, smartphone, tablet, etc. connected to the computing device 110. In other embodiments, the external computer is system administrator computer 138 or other computing device of a system administrator or other person responsible for the computing device 110 where the system administrator computer 138 or other computing device is connected to the computing device 110 over a computer network 140.

In some embodiments, the external computing device is a management server 132 connected over a management network 134. In the embodiments, the computing device 110 may include a BMC 130. Where the computing device 110 includes a BMC 130, some or all of the protection apparatus 102 is included in the BMC 130. In other embodiments, the protection apparatus 102 is external to the BMC 130 but is in communication with the BMC 130.

In some embodiments, the apparatus 400 includes a light module 404 and/or a sound module 406. In some embodiments, in response to the cord compliance module 302 determining that the power cord 118 is of a type that is not rated for use with the power supply 108, the light module 404 is configured to generate a visual alert signal for a visual indicator 126 on the computing device 110 visible to a user and/or the sound module 406 is configured to generate an audible indicator for a speaker 128 in the computing device 110.

Where the protection apparatus 102 includes a light module 404 and a visual indicator 126, the visual indicator 126 may be an LED lamp (e.g., light bulb), an incandescent lamp, a halogen lamp, or other type of lamp. In some embodiments, visual indicator 126 is dedicated for use with the protection apparatus 102. In other embodiments, the visual indicator 126 is used for other functions. In some examples, the visual indicator 126 is a light that indicates that the power supply 108 is not functioning properly and the light module 404 provides one input of two or more inputs to the light.

In other embodiments, the visual indicator 126 is a display device capable of displaying a message, such as a fixed display or a digital display. In some embodiments, the display device is dedicated for use with the protection apparatus 102. In other embodiments, the digital display device is used for other functions and the light module 404 sends a visual alert signal capable of displaying a message that the power supply 108 has not started and/or that the power cord 118 is not compliant with the power supply 108 and/or computing device 110.

In embodiments with a sound module 406 and speaker 128, the speaker 128 may be dedicated for use with the protection apparatus 102. In such examples, the speaker 128 may be of limited capability, may be built into a visual indicator 126, or the like. In other embodiments, the speaker 128 is a multi-use speaker for use by the computing device 110 for messages, for playing music, etc. and the sound module 406 generates an audible indicator that includes a tone, a variable tone, a warning sound, an alarm sound, spoken words, or other audible signal to be played by the speaker 128 to warn a user that the power supply 108 has not started up and/or that the power cord 118 is not compatible with the power supply 108 and/or the computing device 110.

In some embodiments, in response to the cord information indicating that the power cord 118 is configured for a current lower than the rated current and/or a voltage higher than a rated voltage of the power supply 108, the light module 404 generates a visual alert signal and/or the sound module 406 generates an audible indicator to provide a warning message prior to the power cord 118 being plugged into the power supply 108. The warning message is configured to warn a user to not plug the power cord 118 into the power supply 108. In the embodiments, the close-range sensor 104 and associated close-range sensor technology are capable of detecting and reading the close-range sensor tag 122 prior to the plug 120 being plugged into the power receptacle 106 and are fast enough for the light module 404 to generate the visual alert and/or the sound module 406 to generate the audible indicator indicating a voltage or current mismatch prior to a user plugging the power cord 118 into the power receptacle 106.

Figure 5:
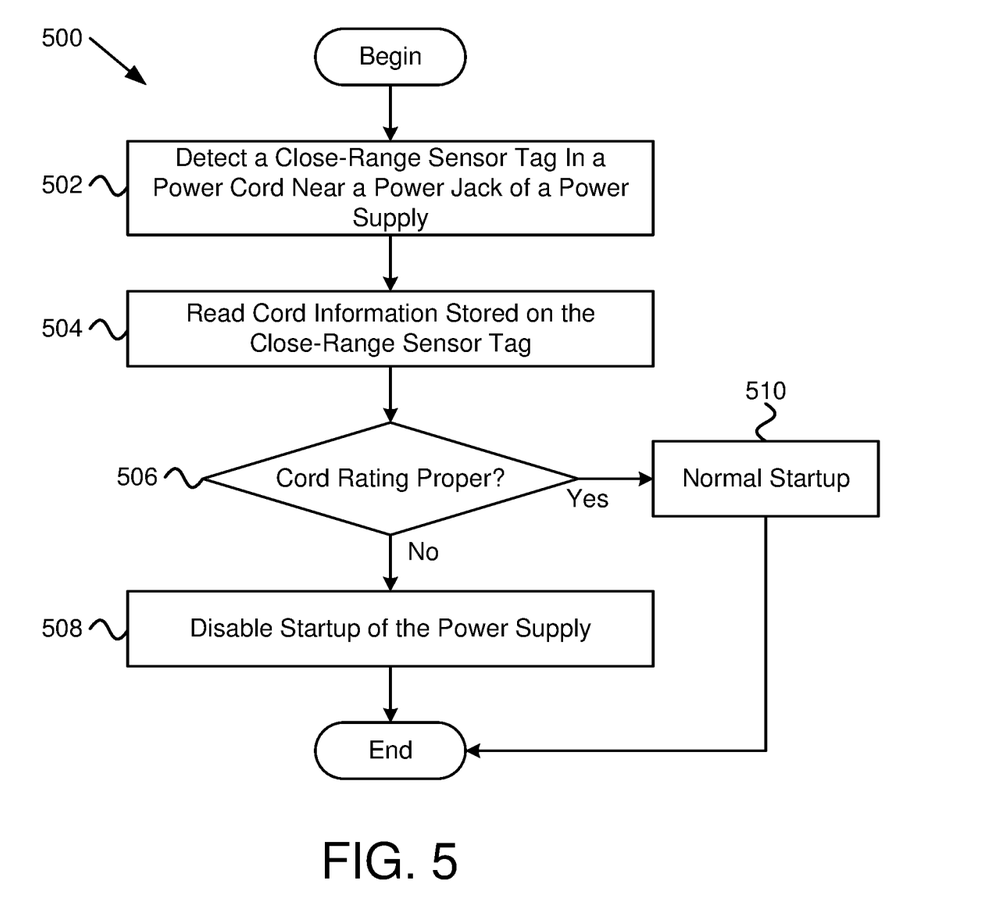
FIG. 5 is a schematic flow chart diagram illustrating a method for verifying correct power cord usage, according to various embodiments.

FIG. 5 is a schematic flow chart diagram illustrating a method 500 for verifying correct power cord usage, according to various embodiments. The method 500 begins and detects 502, using a close-range sensor 104, a close-range sensor tag 122 in a power cord 118 near a power receptacle 106 of a power supply 108 of a computing device 110 and reads 504 cord information stored on the close-range sensor tag 122. The method 500 determines 506 from the cord information if the power cord is of a type that is rated for use with the power supply 108. If the method 500 determines 506 from the cord information that the power cord is not of a type that is rated for use with the power supply 108, the method 500 disables 508 startup of the power supply 108, and the method 500 ends. If the method 500 determines 506 from the cord information that the power cord is of a type that is rated for use with the power supply 108, the method 500 allows 510 normal startup of the power supply 108, and the method 500 ends. In various embodiments, all or a portion of the method 500 is implemented using the close-range sensor 104, the cord compliance module 302, and/or the startup prevention module 304.

Figure 6:
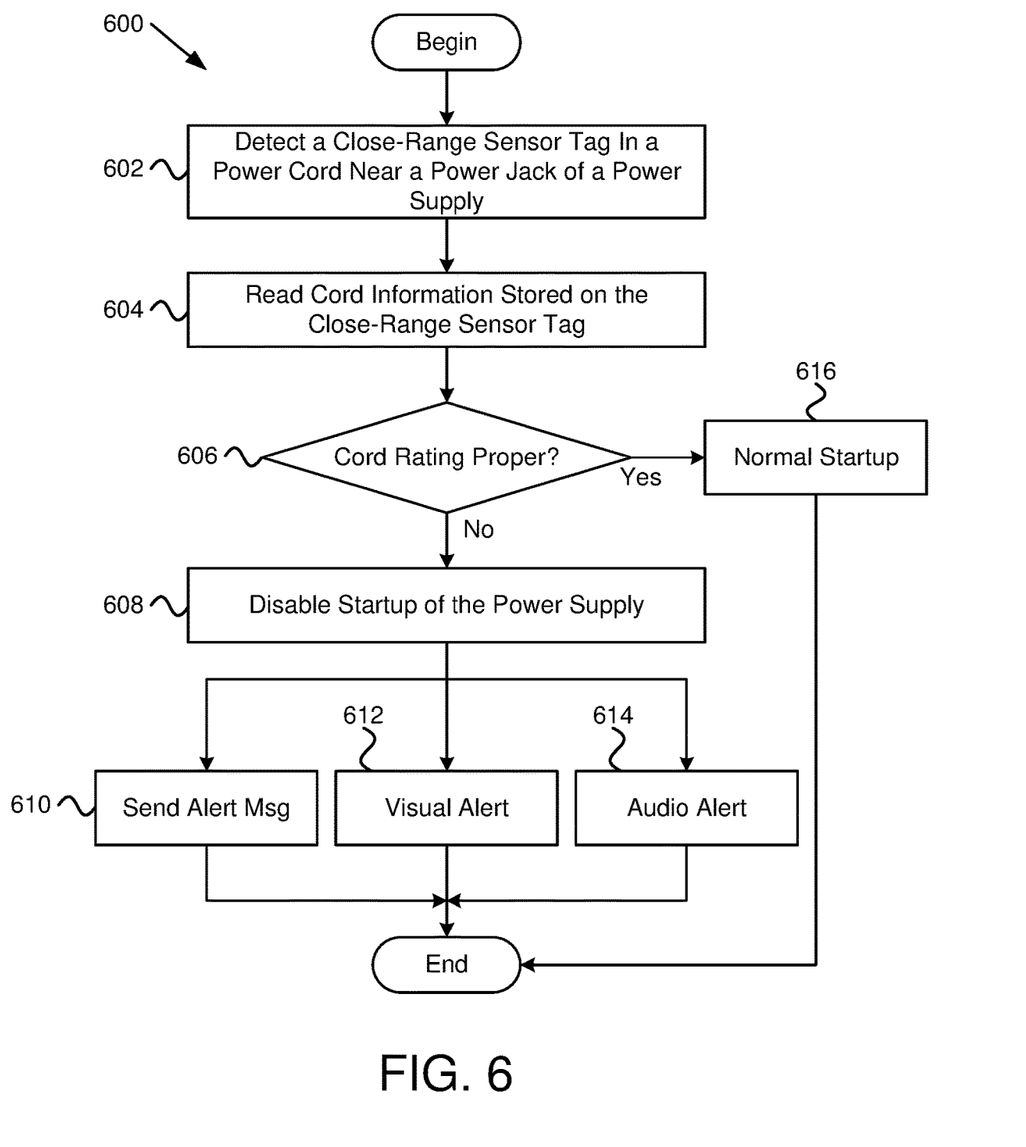
FIG. 6 is a schematic flow chart diagram illustrating another method for verifying correct power cord usage, according to various embodiments.

FIG. 6 is a schematic flow chart diagram illustrating another method 600 for verifying correct power cord usage, according to various embodiments. The method 600 begins and detects 602, using a close-range sensor 104, a close-range sensor tag 122 in a power cord 118 near a power receptacle 106 of a power supply 108 of a computing device 110 and reads 604 cord information stored on the close-range sensor tag 122. The method 600 determines 606 from the cord information if the power cord is of a type that is rated for use with the power supply 108. If the method 600 determines 606 from the cord information that the power cord is not of a type that is rated for use with the power supply 108, the method 600 disables 608 startup of the power supply 108. The method 600, in some embodiments, then sends 610 an alert indicating that the power cord 118 is not rated for use with the power supply 108, the method 600 generates 612 a visual alert signal for a visual indicator 126 on the computing device 110 visible to a user and/or the method 600 generates 614 an audible indicator for a speaker 128 in the computing device 110, and the method 600 ends. If the method 600 determines 606 from the cord information that the power cord is of a type that is rated for use with the power supply 108, the method 600 allows 616 normal startup of the power supply 108, and the method 600 ends. In various embodiments, all or a portion of the method 600 is implemented using the close-range sensor 104, the cord compliance module 302, the startup prevention module 304, the alert module 402, the light module 404, and/or the sound module 406.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    detecting, with a close-range sensor, a close-range sensor tag in a power cord near a power receptacle of a power supply of a computing device;
    reading cord information stored on the close-range sensor tag;
    determining from the cord information that the power cord is of a type that is not rated for use with the power supply;
    disabling startup of the power supply in response to determining that the power cord is of a type that is not rated for use with the power supply; and
    sending, in response to determining that the power cord is of a type that is not rated for use with the power supply, an alert to a baseboard management controller ("BMC") in the computing device and the BMC transmits the alert to a management server external to the computing device.

2. The method of claim 1, further comprising, in response to determining that the power cord is of a type that is not rated for use with the power supply, generating a visual alert signal for a visual indictor on the computing device visible to a user and/or generating an audible indicator for a speaker in the computing device.

3. A method, comprising:
    detecting, with a close-range sensor, a close-range sensor tag in a power cord near a power receptacle of a power supply of a computing device;
    reading cord information stored on the close-range sensor tag;
    determining from the cord information that the power cord is of a type that is not rated for use with the power supply;
    disabling startup of the power supply in response to determining that the power cord is of a type that is not rated for use with the power supply;
    in response to determining that the power cord is of a type that is not rated for use with the power supply, generating a visual alert signal for a visual indictor on the computing device visible to a user and/or generating an audible indicator for a speaker in the computing device; and
    in response to the cord information indicating that the power cord is configured for a current lower than a rated current and/or a voltage higher than a rated voltage of the power supply, generating the visual alert signal and/or generating the audible indicator to provide a warning message prior to the power cord being plugged into the power supply, wherein the warning message is configured to warn a user to not plug the power cord into the power supply.

4. The method of claim 1, wherein determining from the cord information that the power cord is of a type that is not rated for use with the power supply comprises determining that from the cord information that the power cord is not approved for use with the power supply by a regulatory agency with jurisdiction over power cords.

5. The method of claim 1, wherein the close-range sensor tag is located in a plug of the power cord and wherein detecting the close-range sensor tag near the power cord comprises detecting the close-range sensor tag in the plug is within 10 centimeters of the power receptacle of the power supply.

6. The method of claim 1, wherein detecting the close-range sensor tag comprises a Radio Frequency Identifier ("RFID") tag.

7. The method of claim 1, wherein the power cord comprises a plug configured to plug into the power supply, the plug compliant with an International Electrotechnical Commission ("IEC") 320 C13 standard.

8. An apparatus comprising:
  a close-range sensor configured to:
    detect a close-range sensor tag in a power cord near a power receptacle of a power supply of a computing device; and
    read cord information stored on the close-range sensor tag;
  a cord compliance module configured to determine from the cord information that the power cord is of a type that is not rated for use with the power supply; and
  a startup prevention module configured to disable startup of the power supply in response to the cord compliance module determining that the power cord is of a type that is not rated for use with the power supply; and
  in response to the cord compliance module determining that the power cord is of a type that is not rated for use with the power supply, a light module configured to generate a visual alert signal for a visual indictor on the computing device visible to a user and/or a sound module configured to generate an audible indicator for a speaker in the computing device; and
  in response to the cord information indicating that the power cord is configured for a current lower than a rated current and/or a voltage higher than a rated voltage of the power supply, the light module is configured to generate the visual alert signal and/or the sound module is configured to generate the audible indicator to provide a warning message prior to the power cord being plugged into the power supply, wherein the warning message is configured to warn a user to not plug the power cord into the power supply,
  wherein said modules comprise hardware circuits, a programmable hardware device, and/or executable code stored on non-transitory computer readable storage media.

9. The apparatus of claim 8, further comprising an alert module configured to, in response to the cord compliance module determining that the power cord is of a type that is not rated for use with the power supply, send an alert indicating that the power cord is not rated for use with the power supply wherein said alert module comprises hardware circuits, a programmable hardware device, and/or executable code stored on non-transitory computer readable storage media.

10. The apparatus of claim 9, wherein the alert is transmitted to an external computing device external to the computing device.

11. The apparatus of claim 10, wherein the external computing device comprises a management server and wherein the alert is transmitted to a baseboard management controller ("BMC") in the computing device and the BMC transmits the alert to the management server.

12. The apparatus of claim 8, wherein determining from the cord information that the power cord is of a type that is not rated for use with the power supply comprises determining that from the cord information that the power cord is not approved for use with the power supply by a regulatory agency with jurisdiction over power cords.

13. The apparatus of claim 8, wherein the close-range sensor tag is located in a plug of the power cord and wherein detecting the close-range sensor tag near the power cord comprises detecting the close-range sensor tag in the plug is within 10 centimeters of the power receptacle of the power supply.

14. A system comprising:
  a computing device comprising a processor;
  a power supply in the computing device configured to provide power to components of the computing device;
  a close-range sensor configured to:
    detect a close-range sensor tag in a power cord near a power receptacle of the power supply of the computing device; and
    read cord information stored on the close-range sensor tag;
  a cord compliance module configured to determine from the cord information that the power cord is of a type that is not rated for use with the power supply; and
  a startup prevention module configured to disable startup of the power supply in response to the cord compliance module determining that the power cord is of a type that is not rated for use with the power supply; and
  in response to the cord compliance module determining that the power cord is of a type that is not rated for use with the power supply, a light module configured to generate a visual alert signal for a visual indictor on the computing device visible to a user and/or a sound module configured to generate an audible indicator for a speaker in the computing device; and
  in response to the cord information indicating that the power cord is configured for a current lower than a rated current and/or a voltage higher than a rated voltage of the power supply, the light module is configured to generate the visual alert signal and/or the sound module is configured to generate the audible indicator to provide a warning message prior to the power cord being plugged into the power supply, wherein the warning message is configured to warn a user to not plug the power cord into the power supply,
  wherein said modules comprise hardware circuits, a programmable hardware device, and/or executable code stored on non-transitory computer readable storage media of the computing device.

15. The system of claim 14, further comprising an alert module configured to, in response to the cord compliance module determining that the power cord is of a type that is not rated for use with the power supply, send an alert indicating that the power cord is not rated for use with the power supply wherein said alert module comprises hardware circuits, a programmable hardware device, and/or executable code stored on non-transitory computer readable storage media.

16. A system comprising:
  a computing device comprising a processor;
  a power supply in the computing device configured to provide power to components of the computing device;
  a close-range sensor configured to:
    detect a close-range sensor tag in a power cord near a power receptacle of the power supply of the computing device; and read cord information stored on the close-range sensor tag;

a cord compliance module configured to determine from the cord information that the power cord is of a type that is not rated for use with the power supply; and a startup prevention module configured to disable startup of the power supply in response to the cord compliance module determining that the power cord is of a type that is not rated for use with the power supply; and an alert module configured to, in response to the cord compliance module determining that the power cord is of a type that is not rated for use with the power supply, send an alert indicating that the power cord is not rated for use with the power supply, wherein the alert is transmitted to a baseboard management controller ("BMC") in the computing device and the BMC transmits the alert to a management server external to the computing device, wherein said modules comprise hardware circuits, a programmable hardware device, and/or executable code stored on non-transitory computer readable storage media.

17. The method of claim 1, further comprising using a low power source configured to operate independently of the power supply to provide power to control circuits of a switchmode converter of the power supply and to the close-range sensor, wherein the power is provided for detecting the close-range sensor tag, reading the cord information, determining that the power cord is of a type not rated for use with the power supply, disabling startup of the power supply, and sending the alert.

18. The method of claim 3, further comprising using a low power source configured to operate independently of the power supply to provide power to control circuits of a switchmode converter of the power supply and to the close-range sensor, wherein the power is provided for detecting the close-range sensor tag, reading the cord information, determining that the power cord is of a type not rated for use with the power supply, disabling startup of the power supply, and sending the visual alert signal and/or the audible indicator.

19. The apparatus of claim 8, further comprising a low power source configured to operate independently of the power supply, the low power source configured to provide power to control circuits of a switchmode converter of the power supply and to the close-range sensor, wherein the low power source provides power for detecting the close-range sensor tag, reading the cord information, determining that the power cord is of a type not rated for use with the power supply, disabling startup of the power supply, and sending the visual alert signal and/or the audible indicator.

20. The apparatus of claim 19, wherein the low power source comprises an energy storage device.

21. The system of claim 14, further comprising a low power source configured to operate independently of the power supply, the low power source configured to provide power to control circuits of a switchmode converter of the power supply and to the close-range sensor, wherein the low power source provides power for detecting the close-range sensor tag, reading the cord information, determining that the power cord is of a type not rated for use with the power supply, disabling startup of the power supply, and sending the visual alert signal and/or the audible indicator.

22. The system of claim 16, further comprising a low power source configured to operate independently of the power supply, the low power source configured to provide power to control circuits of a switchmode converter of the power supply and to the close-range sensor, wherein the low power source provides power for detecting the close-range sensor tag, reading the cord information, determining that the power cord is of a type not rated for use with the power supply, disabling startup of the power supply, and sending the alert.

* * * * *